June 13, 1972    R. LEHMKUHL    3,669,556

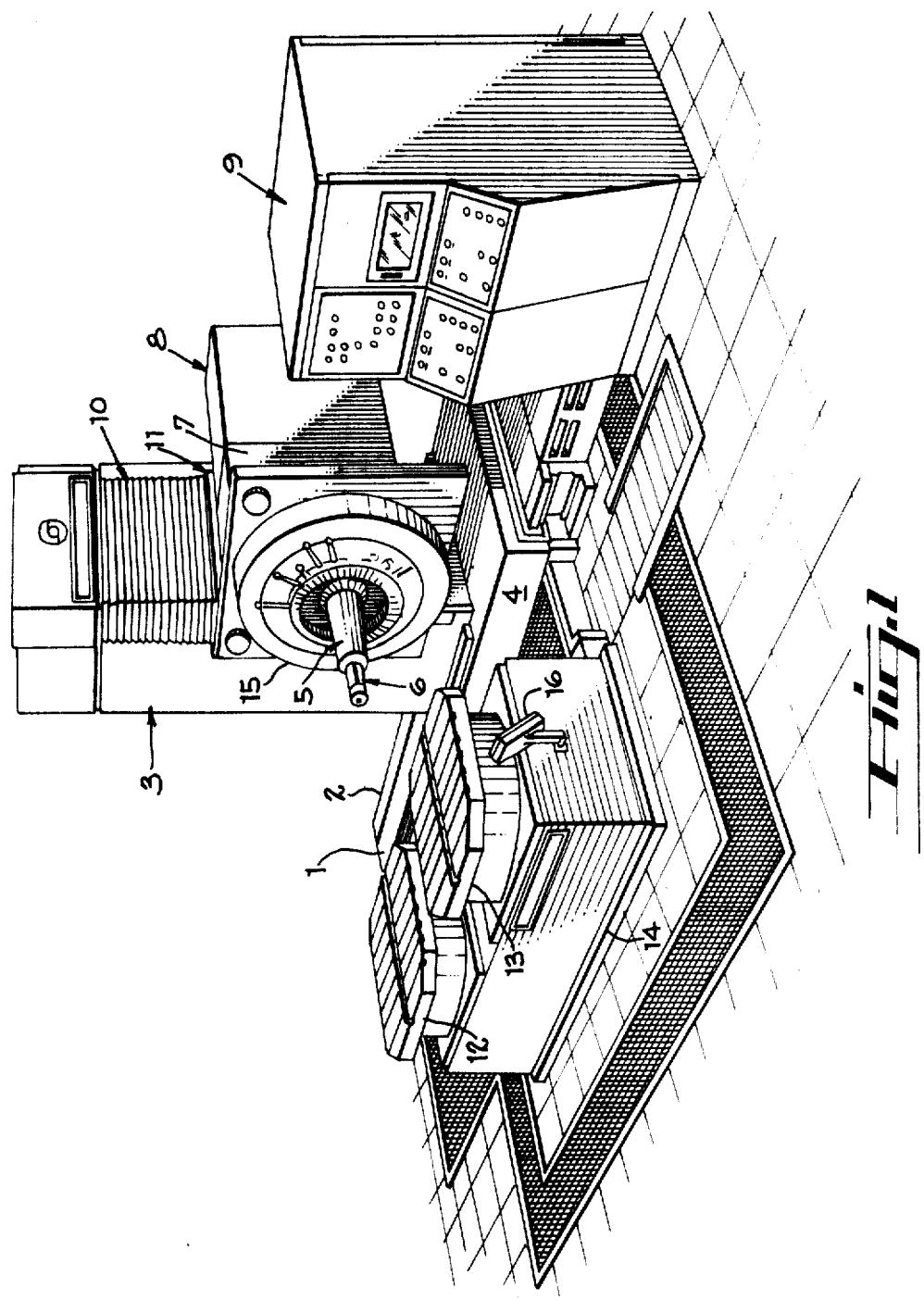

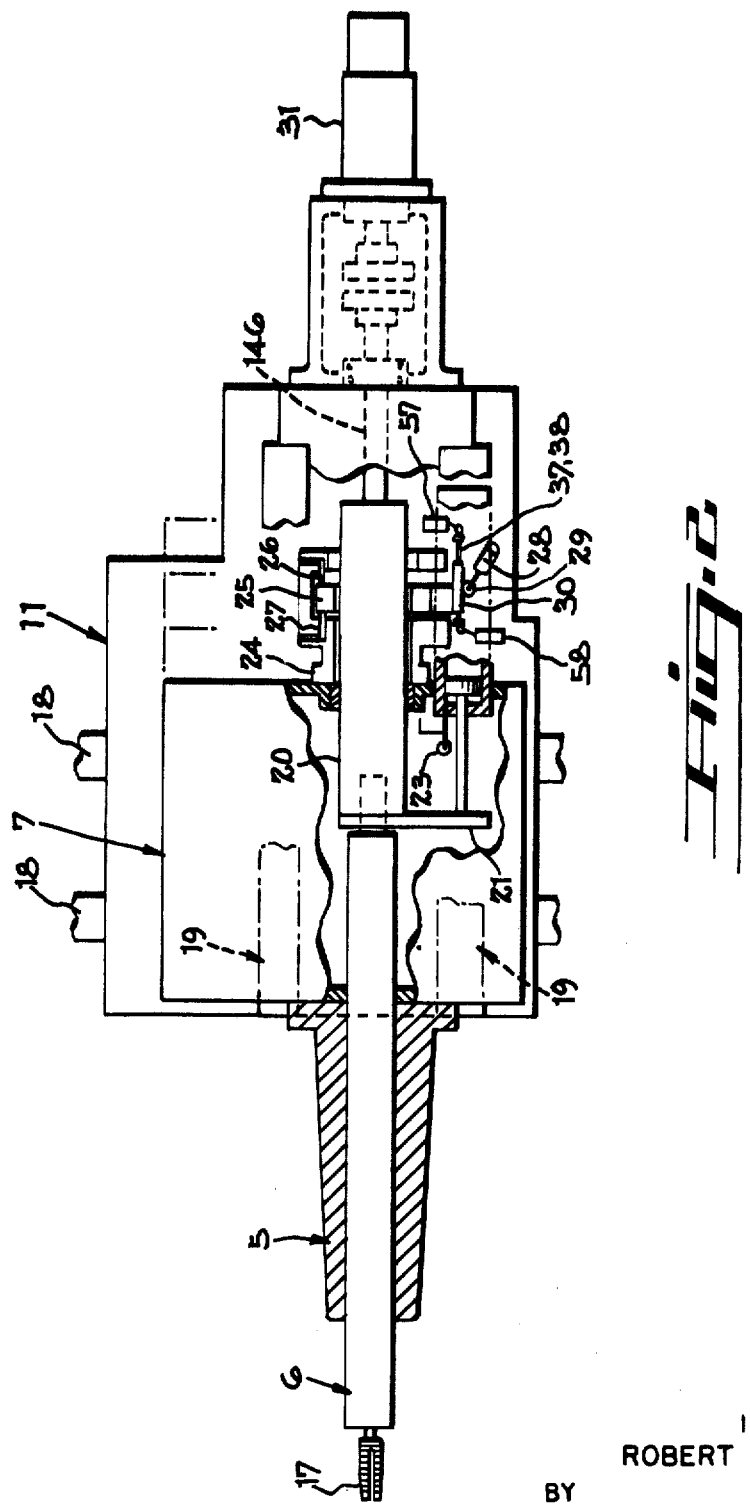

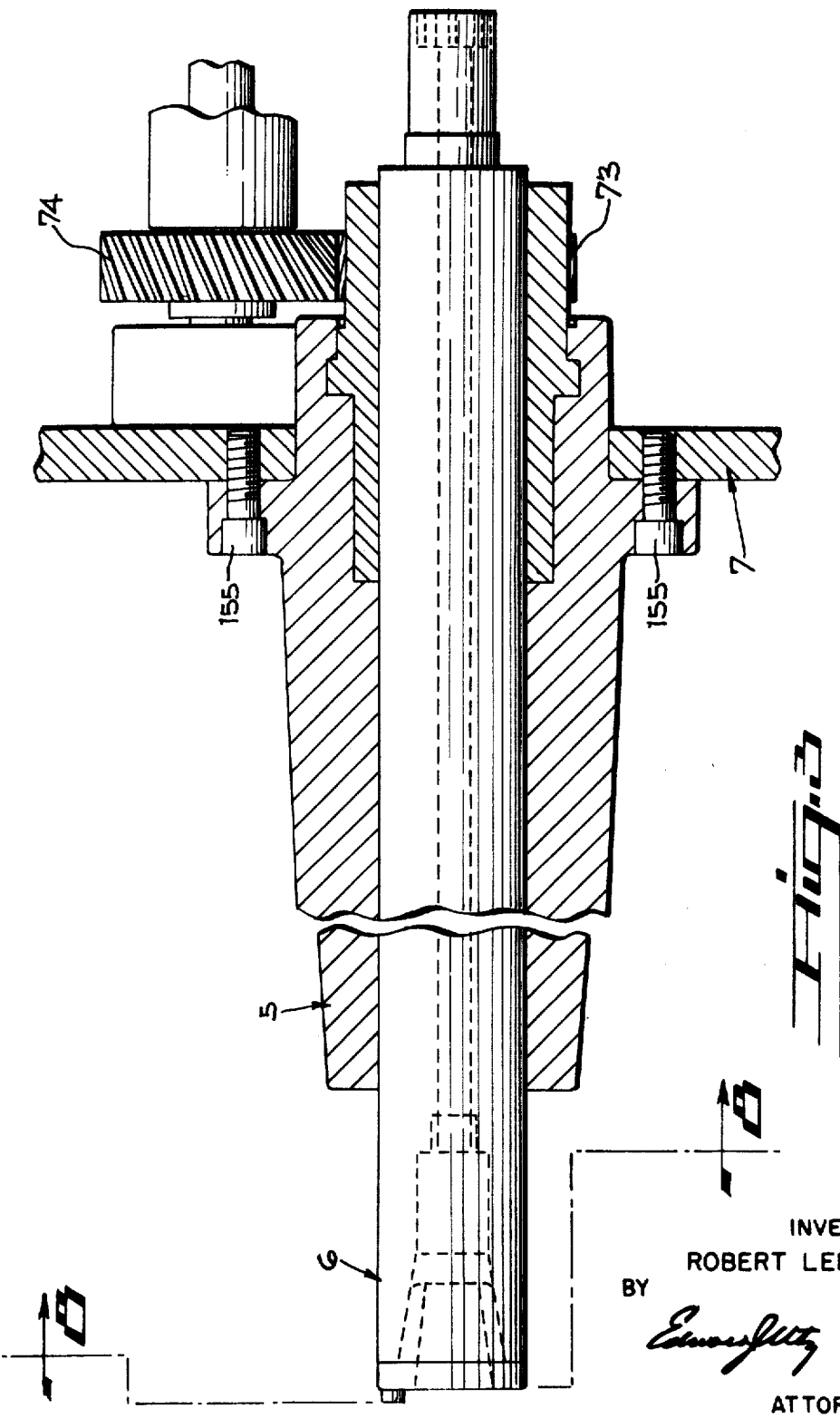

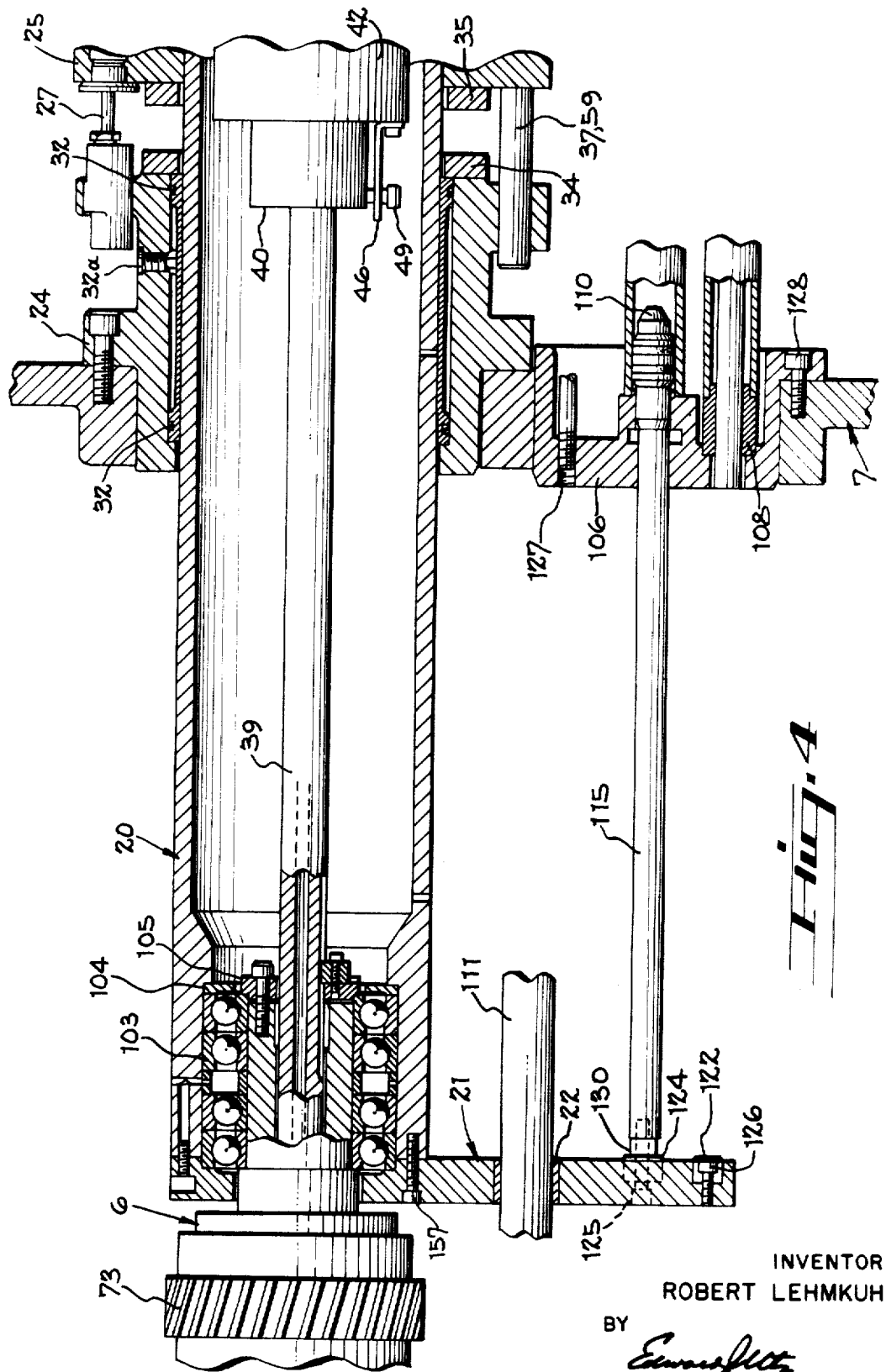

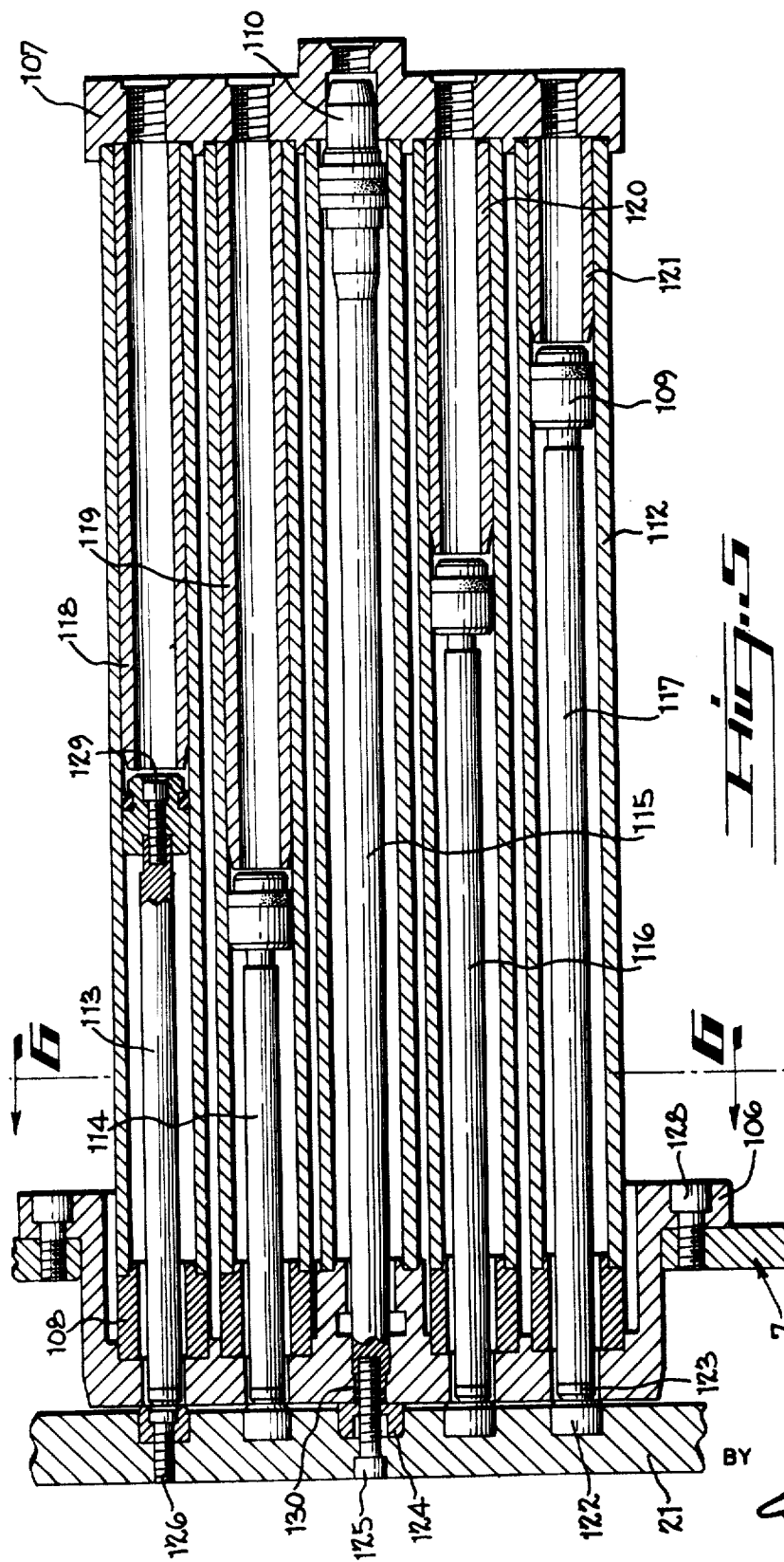

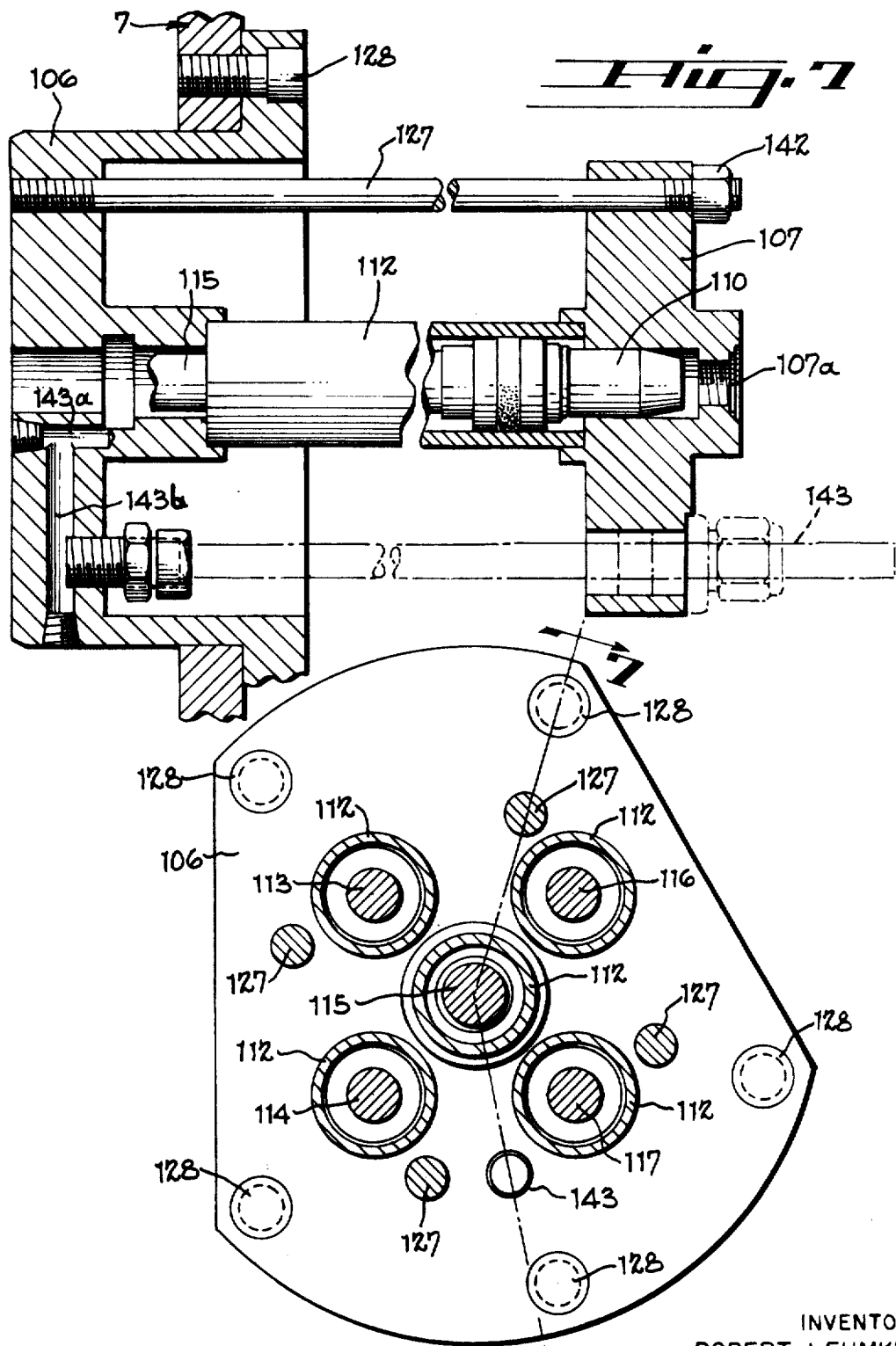

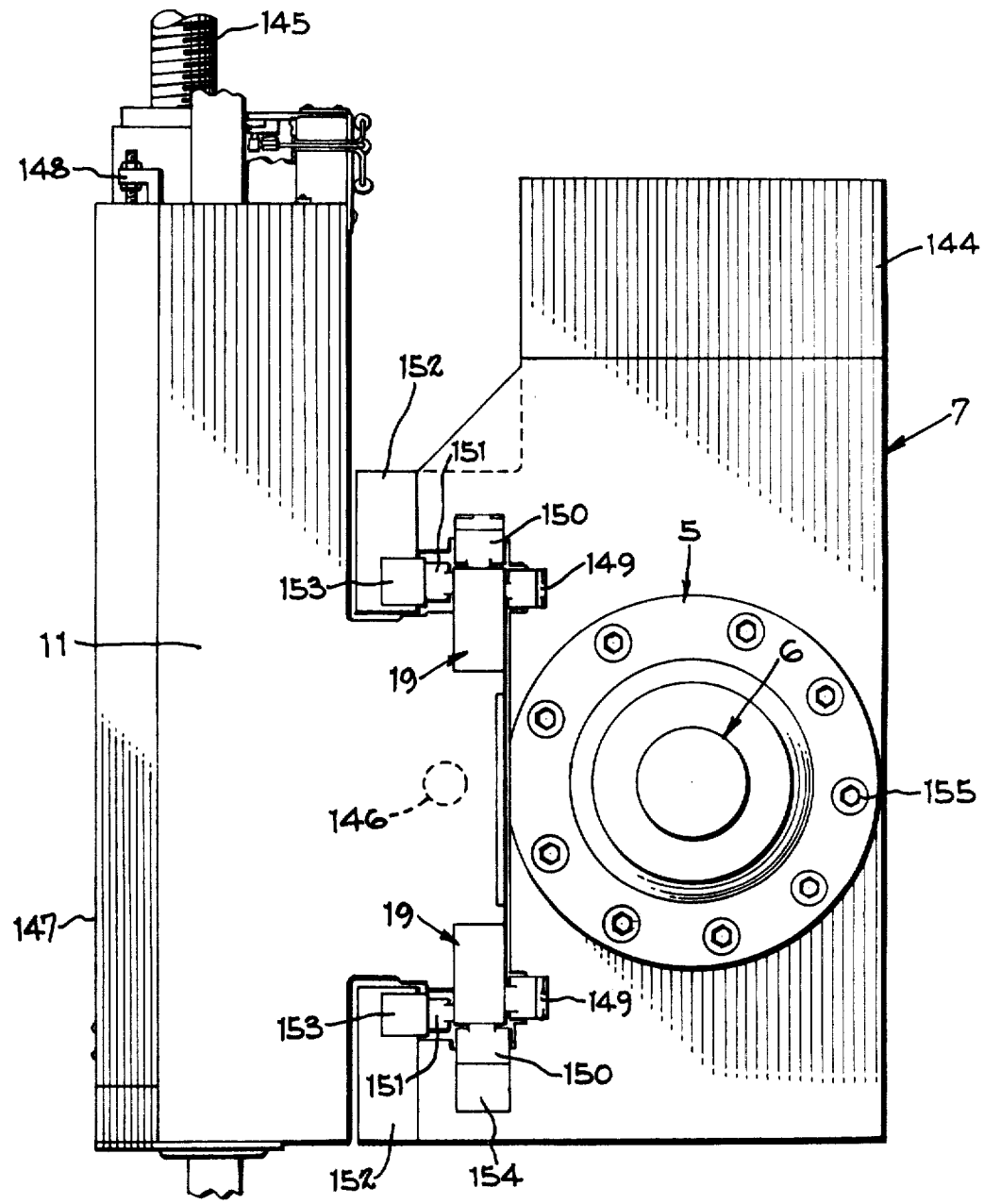

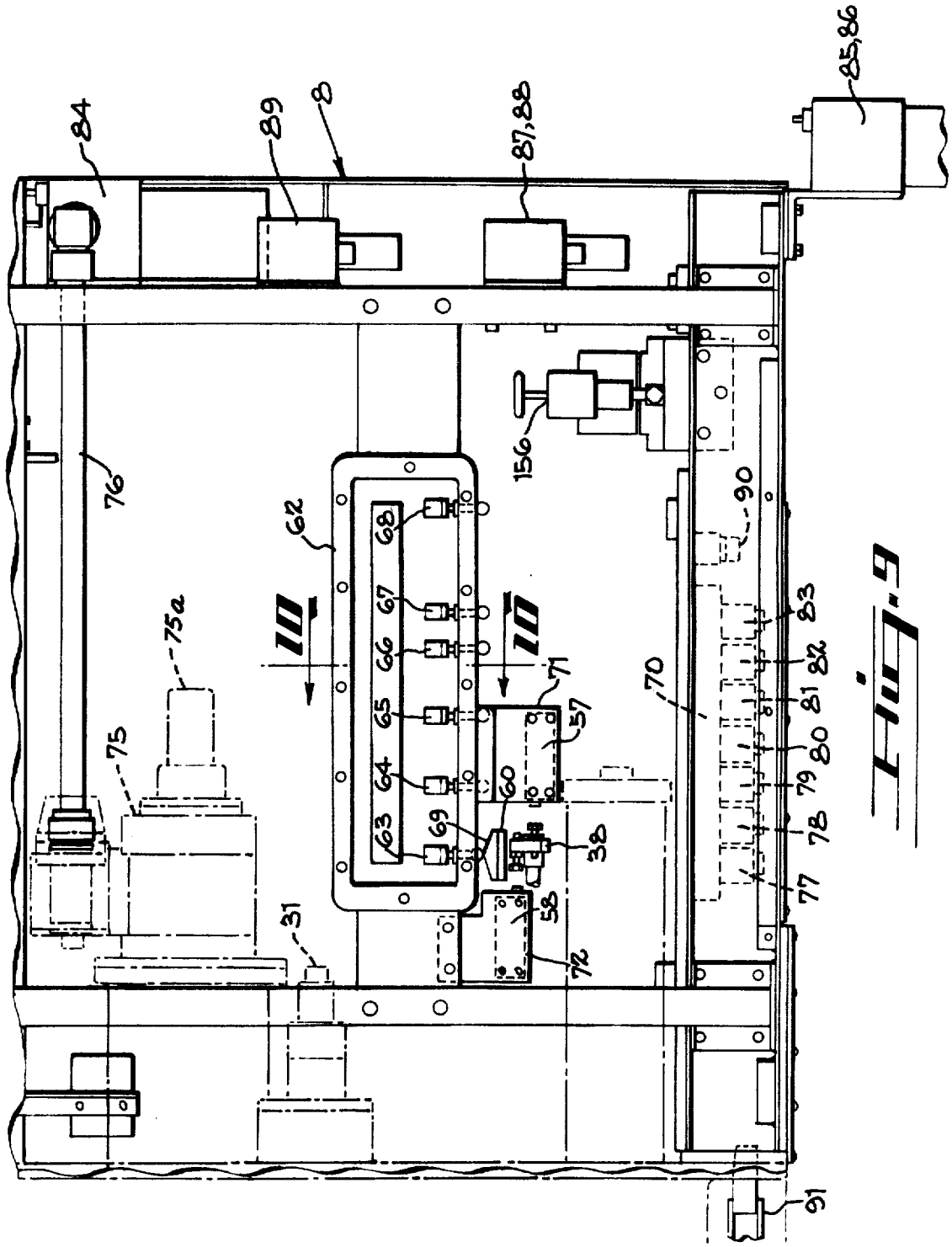

AUTOMATIC MACHINING CENTER

Filed Aug. 10, 1970    14 Sheets-Sheet 10

INVENTOR
ROBERT LEHMKUHL
BY
[signature]
ATTORNEY

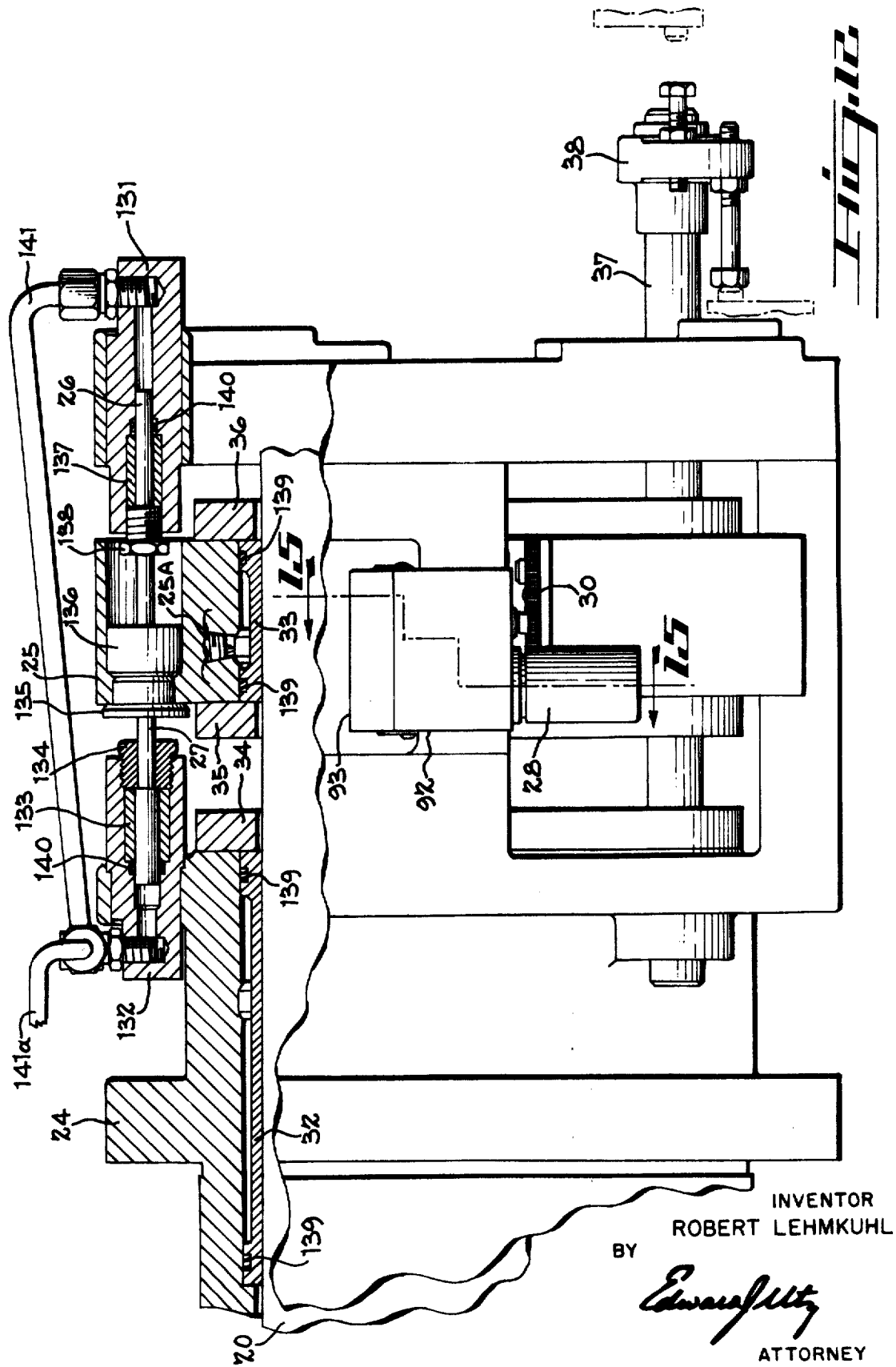

June 13, 1972   R. LEHMKUHL   3,669,556
AUTOMATIC MACHINING CENTER
Filed Aug. 10, 1970   14 Sheets-Sheet 12
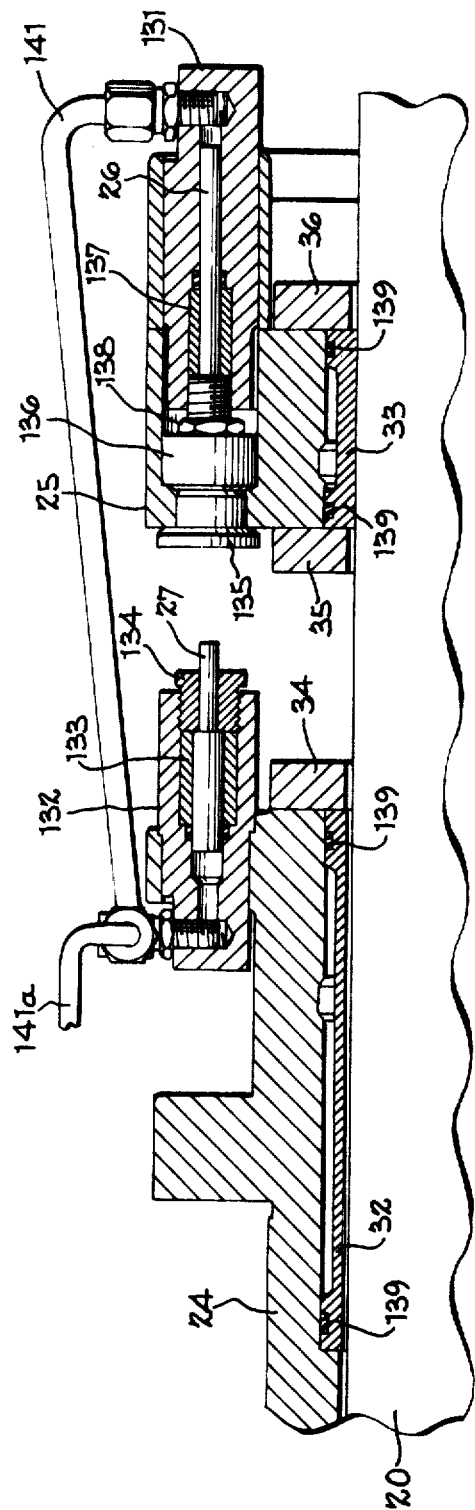
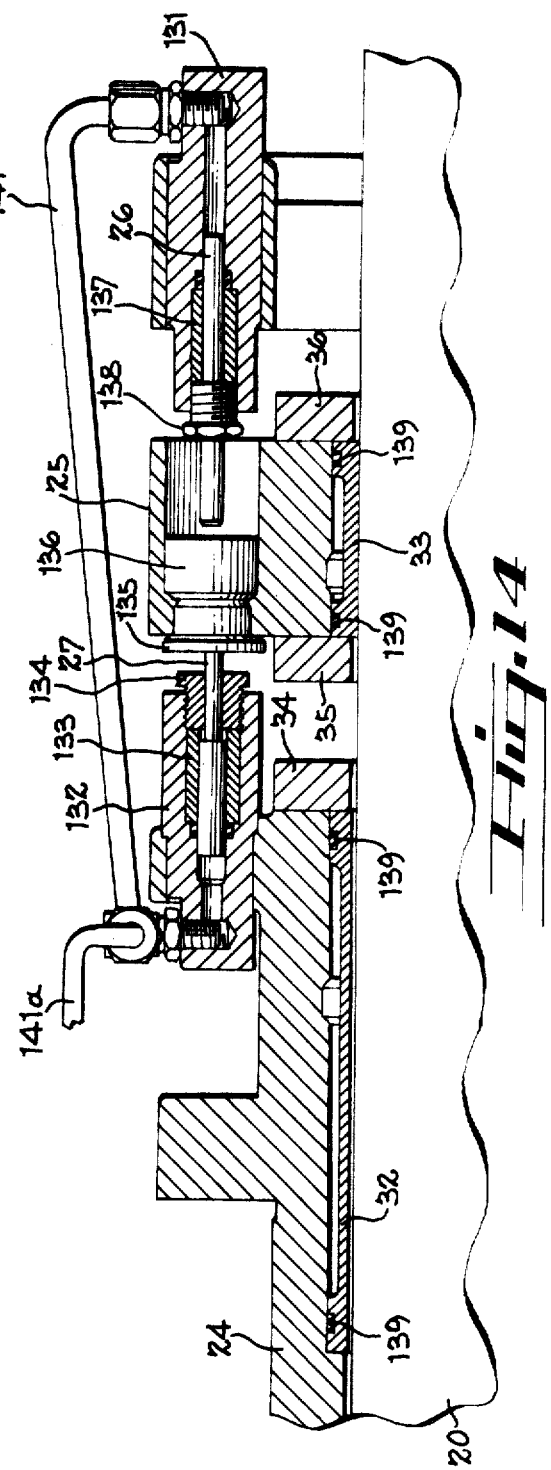
INVENTOR
ROBERT LEHMKUHL
BY
*Edward J. Utz*
ATTORNEY INVENTOR
ROBERT LEHMKUHL
BY
Edward Selty
ATTORNEY

United States Patent Office 3,669,556
Patented June 13, 1972

3,669,556
AUTOMATIC MACHINING CENTER
Robert Lehmkuhl, Cincinnati, Ohio, assignor to The Carlton Machine Tool Company, Cincinnati, Ohio
Filed Aug. 10, 1970, Ser. No. 62,507
Int. Cl. B23c 1/00
U.S. Cl. 408—10         6 Claims

ABSTRACT OF THE DISCLOSURE

An automatic machining center having a free floating spindle in a head for carrying a tool, the head being secured to a vertical saddle, which in turn is secured to a column, which in turn is secured to a horizontal saddle, and a method for advancing head and spindle to a predetermined position, then advancing the spindle until it contacts the work surface, then employing a spindle clamp and surface sense memory clamp and feeding the head and spindle at a predetermined rate until the tool reaches a predetermined depth.

---

My invention relates to an automatic machining center equipped with a variety of cutting tools, specifically useful for boring, milling, surface sense drilling and surface sense tapping.

The primary object of my invention is to provide a configuration of spindle and head, permitting either discrete or random positioning of the spindle with respect to the head, and then feeding the head and spindle as a unit.

Another object of my invention is to provide for feeding the tool into the workpiece, by first positioning the tool in the spindle and then advancing the spindle to a previously programmed position, clamping the spindle to the head then feeding the head with the spindle clamped in its previously located position into the workpiece.

Another object of my invention is to provide a machine tool having a short stroke, in close proximity to the work and to be used in connection with surface sensing.

Another object of my invention is to provide a tool which may be advanced to a discrete position and clamped, and the spindle fed in its clamped position into the workpiece.

Another object of my invention is to provide for releasing and traversing the spindle with a random length tool, surface sensing at some random position then clamping the spindle to the head and feeding the head with the spindle clamped into the workpiece.

Another object of my invention is to provide for retracting the spindle a predetermined distance from the surface sense point, including releasing the spindle from its clamping position, repositioning the tool for the next operation, advancing, surface sensing, clamping and drilling to a predetermined depth.

Another object of my invention is to provide for surface sense tapping, wherein the spindle is released, the spindle is traversed to a surface sense point determined when the tap contacts the work, and then clamping a surface sense memory clamp to the spindle and proceeding to tap.

Another object of my invention is to provide a free floating spindle which will follow a tap after the initial pressure has been exerted upon the spindle to start the tap to cut the first thread, or portion thereof.

Another object of my invention is to provide a machine having a free floating spindle with a tap and a memory clamp secured to said spindle so that when the tap advances into the work, the memory clamp actuates a rotary electrical transducer secured to the head which causes the head, by means of an electrical error signal, to follow the spindle as the tap advances into the workpiece. After a predetermined depth is reached, the tap is reversed causing the spindle to retract from the workpiece and the head follows the spindle to its predetermined position.

Another object of my invention is to have the rotary electrical transducer that is actuated by the memory clamp provide an indication that a tapping malfunction has occurred.

Another object of my invention is to provide a device adapted to be used with an automatic tool changer, as described in U.S. Letters Patent No. 3,451,125.

Another object of my invention is to provide a configuration in a machine tool whereby the surface sense feature may be used without special consideration in the control logic.

Another object of my invention is to provide for means for operating a power tool lock.

Other objects of my invention will appear from the detailed description to follow.

In general my invention comprises an improved machine tool having a bedplate on which a movable horizontal saddle is supported. I secure a column to the horizontal saddle, the column being provided with a vertical screw which carries a second saddle which carries the head, which is provided with a spindle member. The column, saddle and head and spindle members are mounted relative to fixed tables fastened adjacent to the bedplates to permit workpieces on said tables to be mounted so that the spindle may perform cutting operations on said workpieces.

In a machine tool such as I have described in my invention, I accomplish the feeding of the tool into the workpiece by first positioning the cutting tool in the spindle and then advancing the spindle to a previously programmed position and then feeding the head with the spindle in its previously located position into the workpiece.

In my invention I provide six discrete positions for the spindle in its relation with the head member. The spindle is extended to one of these six positions and then the head and spindle as a unit are fed into the workpiece.

In my invention I also provide for surface sensing such as is known in the art and described in Pat. No. 3,302,492. In that patent for use with random length tools which are not pre-programmed the spindle is extended until the tool touches the workpieces whereupon the spindle is automatically clamped within the head and then the head and spindle together are fed into the work.

The six discrete positions are employed in boring and milling operations while drilling and tapping is generally done with surface sensing. In tapping we use a free floating spindle which will follow a tap after axial thrust has been exerted on the spindle to start the tap to cut the first thread or portion thereof. In tapping or drilling we rapidly advance the head and spindle as a unit to a predetermined position commonly referred to as the "R" plane. In drilling, the spindle rapidly advances independent of the head until the tool contacts the work surface whereby the spindle is clamped to the head to take axial thrust and the surface sense memory clamp is also actuated and then the head and spindle are fed as a unit at a predetermined feed rate until the drill reaches the proper depth. We have a choice of withdrawing the spindle and head to their full retracted position, or we may utilize the short stroke feature of the machine. In short stroking after the drilling operation the head may be withdrawn to the "R" plane, and the spindle is then withdrawn one inch into the head which is determined by the surface sense memory clamp and then the head is moved to a new position for further drilling.

In tapping as well as drilling we begin with the head and spindle in their fully retracted position and in tapping we advance the head and spindle to the "R" plane, then the spindle is advanced independent of the head until the tap contacts the work surface and the spindle is then rotated and then after axial thrust has been exerted on the spindle to start the tap to cut the first thread or portion thereof the spindle freely floats and follows the tap to a predetermined depth. In tapping, when the tap contacts the work we start the spindle rotating, exert an axial thrust on the spindle and we actuate the surface sense memory clamp. As the spindle follows the tap into the hole the memory clamp through a precision rack and pinion will drive an electrical rotary transducer which in turn generates an error signal in the head positioning control circuit thereby causing the head to follow the free floating spindle as the tap advances into the work. When the head which is controlled by the positioning device reaches the programmed depth which is also the depth of the tapped hole, because of the small lag between the head and spindle, the control then signals the spindle to reverse which causes the free floating spindle to follow the tap out of the hole and the electrical rotary transducer again signals the control which causes the head to retract along with the spindle. The head follows the spindle out until the tap is free of the work at which point the head will be coincidental with the "R" plane. The head and spindle will either fully retract or if short stroke has been programmed the head will remain at "R" plane and the spindle will retract one inch from the point of surface sensing and we then position the machine to tap the next hole.

In the event of a malfunction, such as a broken tap or slipping tap driver, the spindle does not advance allowing the head to overcome its lag with the spindle to actuate an in position signal from the electrical rotary transducer. The combination of this in position signal and the failure to reach the desired depth will produce a malfunction signal at the controls to signal the operator and automatically stop the machine.

The six discrete positions are determined by the proper selection of a combination of cylinders which are located in the head and cooperate with the spindle through a yoke. The center cylinder is used for surface sensing. In drilling and tapping we employ the surface sensing mechanism and in boring and milling we employ six accurate known discrete positions which are programmed. We interchange between the two operations by applying hydraulic pressure to any or a combination of any of the cylinders other than the rod end of the center cylinder, which is under constant hydraulic pressure except when spindle is in a free floating state. The ability to interchange from random to accurate known positioning simplifies the design and logic of the control to effect substantial savings by utilizing a simplified logic control.

In the drawings, the same reference numerals refer to the same or similar parts throughout the several views, and the sectional views are taken looking in the direction of the arrows at the ends of the section lines.

FIG. 1 is a prospective view of the machine tool of my invention.

FIG. 2 is a memory clamp schematic view of my invention.

FIG. 3 is a view showing the details in general of the hydrostatic spindle of my invention.

FIG. 4 is a view showing in general the spindle clamp and portion of spindle positioner utilized with my invention.

FIG. 5 is a view in general showing the mechanism for controlling spindle travel.

FIG. 6 is an end view taken in section of the device shown in FIG. 5.

FIG. 7 is a detailed sectional view taken along the lines 7—7 of FIG. 6.

FIG. 8 is an end view taken along the lines 8—8 of FIG. 3.

FIG. 9 is a side view of the head assembly including brackets.

FIG. 12 is a sectional view taken along the lines 12—12 of FIG. 10.

FIG. 13 is a partial sectional view of the spindle clamp shown in FIG. 12, indicating the clamp position during a short stroke spindle retract.

FIG. 14 is a partial sectional view of the spindle clamp shown in FIG. 12, indicating the clamp position during a tapping operation.

Figure 10:
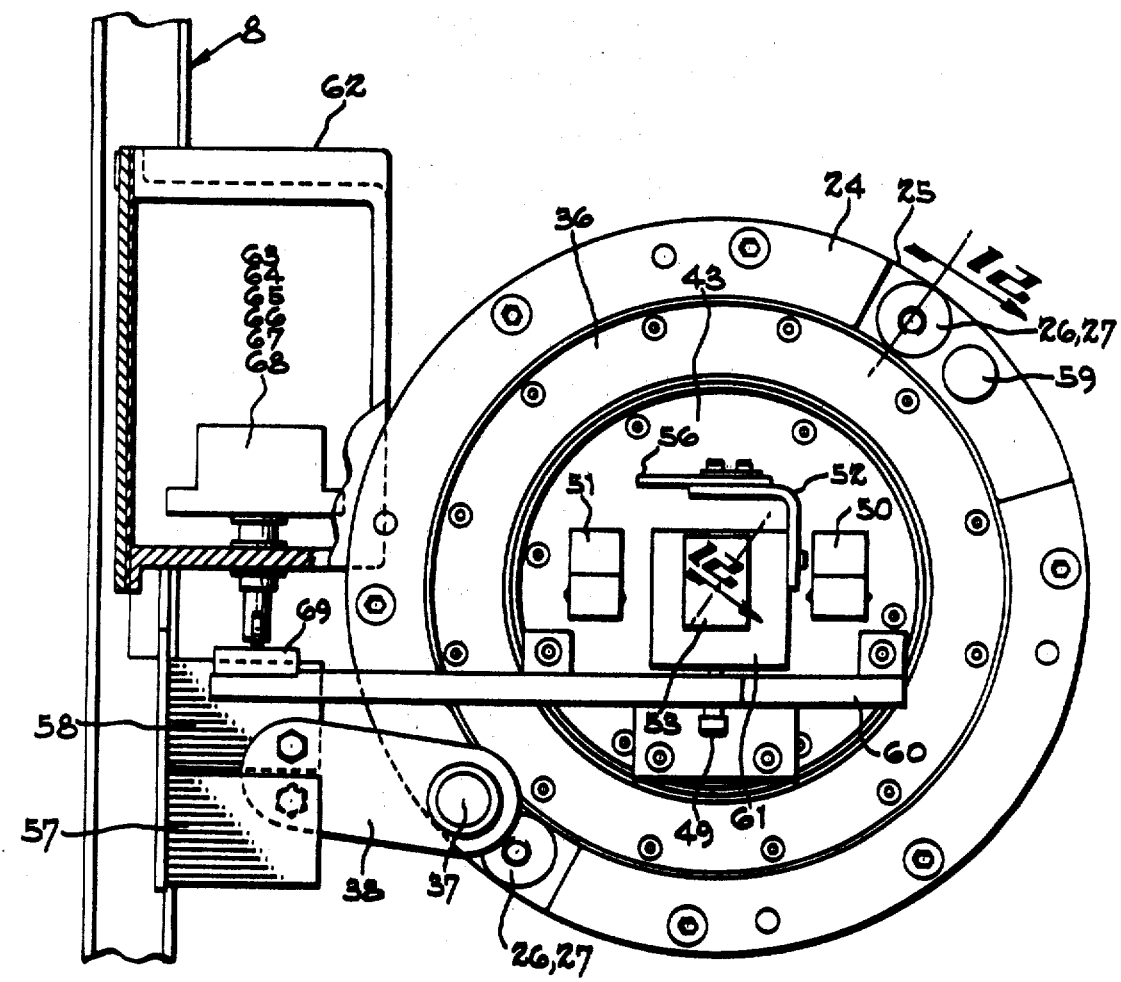
FIG. 10 is a view taken along the lines 10—10 of FIG. 9.

Referring now to the drawings, I show in FIG. 1 a bed plate 1, which is provided with ways such as 2 and which supports a saddle 4 which is movable along said bed plate 1, provided with a vertical screw, not shown, which carries a vertical saddle 11, which has a head 7, which carries a spindle 6. The spindle 6 is mounted in a housing 5. The column 3, vertical saddle 11, head 7 and spindle 6 are mounted relative to a pair of fixed tables 12 and 13, which are on a base 14. The column 3 is mounted on the horizontal saddle 4 which moves along bed plate 1 on ways 2.

I provide a tool change mounting bracket 15, secured to the head 7, which may be provided with automatic tool change devices, not shown, nor detailed in this application, but more particularly described in U.S. Letters Patent No. 3,251,125. The controls in the machine are operated from a console 9. The vertical saddle 11 is provided with ways, such as 19, referring to FIG. 2, on which the head 7 moves. Head 7 is moved by means of a ball screw 146, which in turn is driven by a servo mechanism indicated generally at 31 (FIG. 2).

In FIG. 2, I show a surface sense memory clamp indicated generally at 25, which cooperates with the positioning piston 26. An electrical rotary transducer to be described later is indicated at 28 and an electrical rotary transducer pinion indicated at 29. The spindle positioner cylinder and yoke are indicated at 21. In FIG. 2, I show a tap 17 in the spindle 6, carried in the spindle housing 5. The saddle 11 is guided on the vertical column by means of ways 18. A thrust clamp 24 is clamped to the spindle extension 20.

Referring now to FIG. 3, I show the spindle housing 5, carrying the spindle 6, which is driven through helical gears 73 and 74. The spindle housing 5 is secured to the head by a plurality of screws 155.

The spindle extension 20 is shown in detail in FIG. 4. This is the non-rotating portion of the spindle 6 and shows the extension 20, which has an inside circumference in which the thrust bearings 103 are carried and secured in position by ring 104. The bearings are clamped by screws 157, in the spindle extension 20. A bearing retainer 105 clamps the bearings in position on the spindle 6. A tubular shaft 39 extends through the bearings 103 and through the spindle extension 20 and is operated by a tool locking piston 40, provided with a piston guide 46 and a guide pin 49 mounted in a cylinder 42. This non-rotating spindle extension 20 is prevented from revolving by a guide shaft 111, which enters into a yoke 21 provided at the point of entrance of the arm or shaft 111 with the bushing 22. The yoke 21 is controlled in its movement by a series of pistons 115 shown in FIG. 4. A spacer 130 abuts a hardened plug 124, secured into the yoke 21 by a cap screw 125. One end of the piston 115 fits into a bracket 106, secured to the head 7 by cap screws such as 128. The rod 115 is provided with a piston 110, which is double acting. Similar pistons are provided which will be described in detail. The spindle thrust clamp (FIG. 4) is comprised of spindle thrust clamp body 24, thrust clamp sleeve 32 and sleeve retainer 34. The sleeve 32 is deflected for clamping purposes by means of high pressure oil entering through port 32a (FIG. 4). Any lateral motion of the spindle extension 20 with respect to the head 7, is prevented by the thrust clamp assembly which is used during all machining operations, except tapping.

In FIG. 5, I show in detail the spindle positioning mechanism. This mechanism is provided with a yoke 21 and is guided within the head 7. Rear cylinder cap 107 is a cylinder head for five cylinders as indicated by 112 and is secured to cap 106 by tie rods such as 127 and nut 142 (FIGS. 6 and 7). Rod 115 acts within the entire length of a cylinder to limit the travel of the spindle 6 in two directions. It is also used to establish a random position of the spindle when the surface sensing features of my invention are employed. The other piston rods, 113, 114, 116, and 117 are prepositioned to establish the movement of the spindle at predetermined points. The pistons are hydraulically operated. At one edge of each of the pistons a hardened plug such as 122 and 124 is provided and secured in position by means of cap screws such as 126 and 125. The hardened plugs are ground so that they operate in conjunction with a hardened button 123 on the end of the cylinder to produce an accurate position. The cylinders such as 112 are provided with stops such as 108. The mechanism is secured to the head by means of a front cylinder cap 106, which is secured to the head 7 by cap screws 128.

In FIG. 6, which is a section taken along the lines 6—6 of FIG. 5, I show the relationship and location of the five pistons previously described.

In FIG. 7, I show a portion of the head 7. The cap 106 is secured to the head by five cap screws such as 128. The cap 106 is provided with an opening for the main piston rod 115. The oil to be applied to the end of the piston nearest the spindle nose is introduced through a tube 143 into passageways 143a and 143b, to be applied to the rod end of piston 110. Fluid under pressure is applied to the other end of the piston 110 through port 107a. The unit is held together by tie rods 127.

Referring now to FIG. 8, I show the front view of the head 7 and its mounting relationship to the vertical saddle 11. The head 7 is mounted to the saddle 11 and guided along its travel with respect to the saddle by means of cartridge bearings 149, 150 and 151, rolling along hardened ways 19. The cartridge bearings are mounted to the head and fitted for alignment by mounting plates 149. The taper gibs 153 and 154 are used to preload the bearing mounting system.

FIG. 9 shows the head assembly bracket secured to the rear of the head. Secured to the head assembly bracket is a switch enclosure 62, which carries micro switches for indicating discrete spindle positions shown at 63, 64, 65, 66, 67 and 68. Control valves 77, 78, 79, 81, 82 and 83 work in conjunction with spindle positioning mechanism shown in FIG. 5. Valve 80 controls the tool locking mechanism, shown in greater detail in FIG. 11. A clamp pressure switch 87 and a thrust clamp pressure switch 89, and a surface sense pressure switch 88 are provided. The spindle motor 75 is connected to a hydraulic line 76. The spindle is rotated by the spindle motor 75 through the introduction of hydraulic pressure through line 76 controlled by servo valve 75a. A feedback device 31 for controlling the orientation of the spindle for tool changing, and 85 and 86 are filters for the hydrostatic spindle. Limit switch dog 60 operates limit switches 63 through 68, shown more particularly in FIG. 10. The limit switches 63 through 68 are actuated by cam 69 mounted to rod 60, which is connected to spindle extension cap 43. Limit switch 57 indicates a short stroke cycle and limit switch 58 indicates a severe tapping error which are operated by switch dog 38 affixed to a guide rod 37. The guide rod 37 (FIG. 11), is operated by the surface sense memory clamp.

Figure 11:
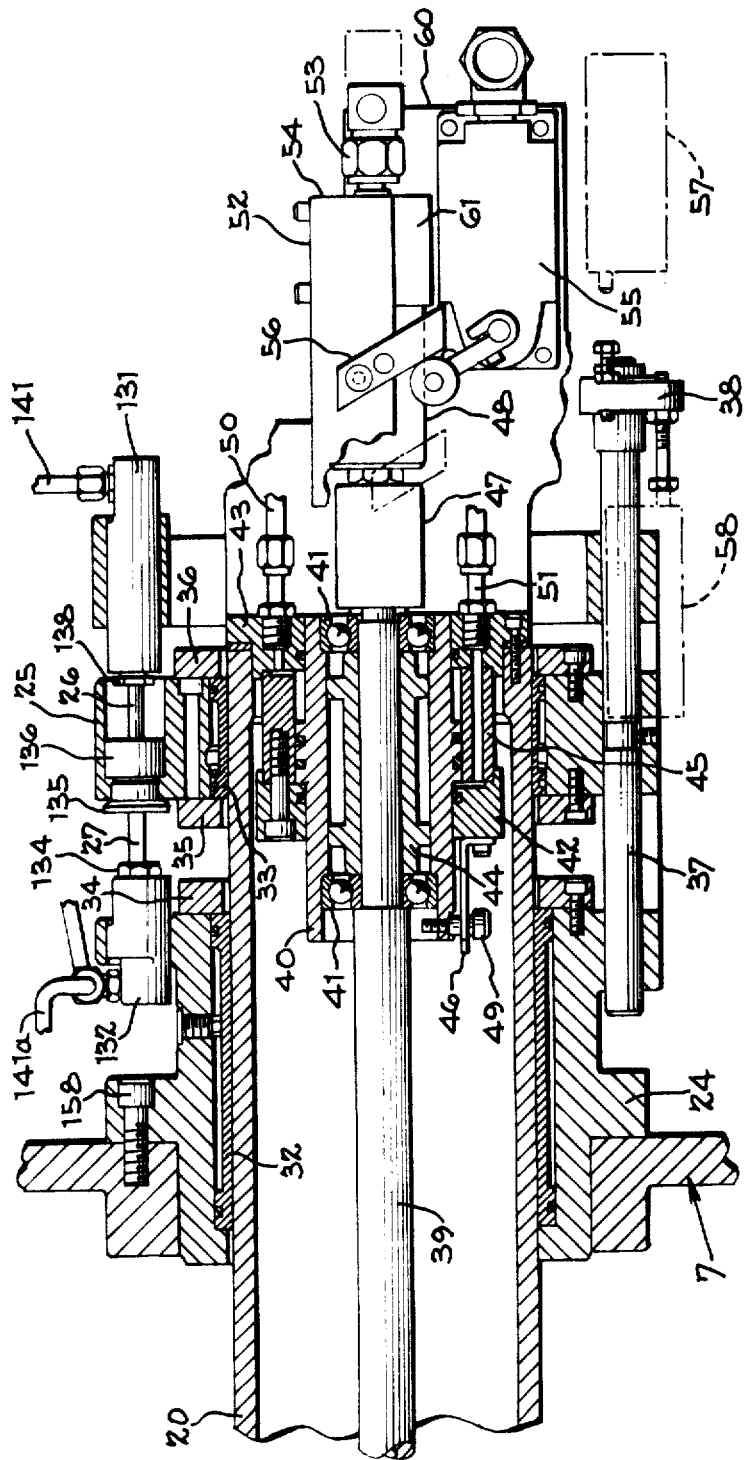
FIG. 11 is a sectional view showing the spindle clamp mechanism.

The surface sense memory clamp assembly and power tool lock cylinder is shown in detail in FIG. 11. The surface sense memory clamp consists of a sleeve 33, sleeve retainers 35 and 36 and surface sense clamp body 25. With limit switch 55 I indicate whether a tool is in the spindle, whether it is clamped or whether the tool lock is released. The switch is actuated by switch dog attached to switch actuator 52 and integral therewith and an adjustable switch dog 56 attached to actuator 52. When hydraulic pressure is applied through fitting 50 or 51, the tool lock piston 40 is stroked to actuate the tool lock and operate the actuator.

Referring to FIG. 12, hydraulic fluid pressure is applied through 141 and 141a to ends of pistons 26 and 27 to center the surface sense clamp. To operate the surface sense memory clamp, pressure is applied through port 25a which clamps the surface sense device to the spindle extension 20 and the exhausting of the oil from the ends of pistons 26 and 27, through 141 and 141a, allows the surface sense memory clamp to follow the motion of the spindle within controlled limits.

FIG. 13 shows the fully retracted position of the memory clamp for short stroke of the spindle.

Figure 15:
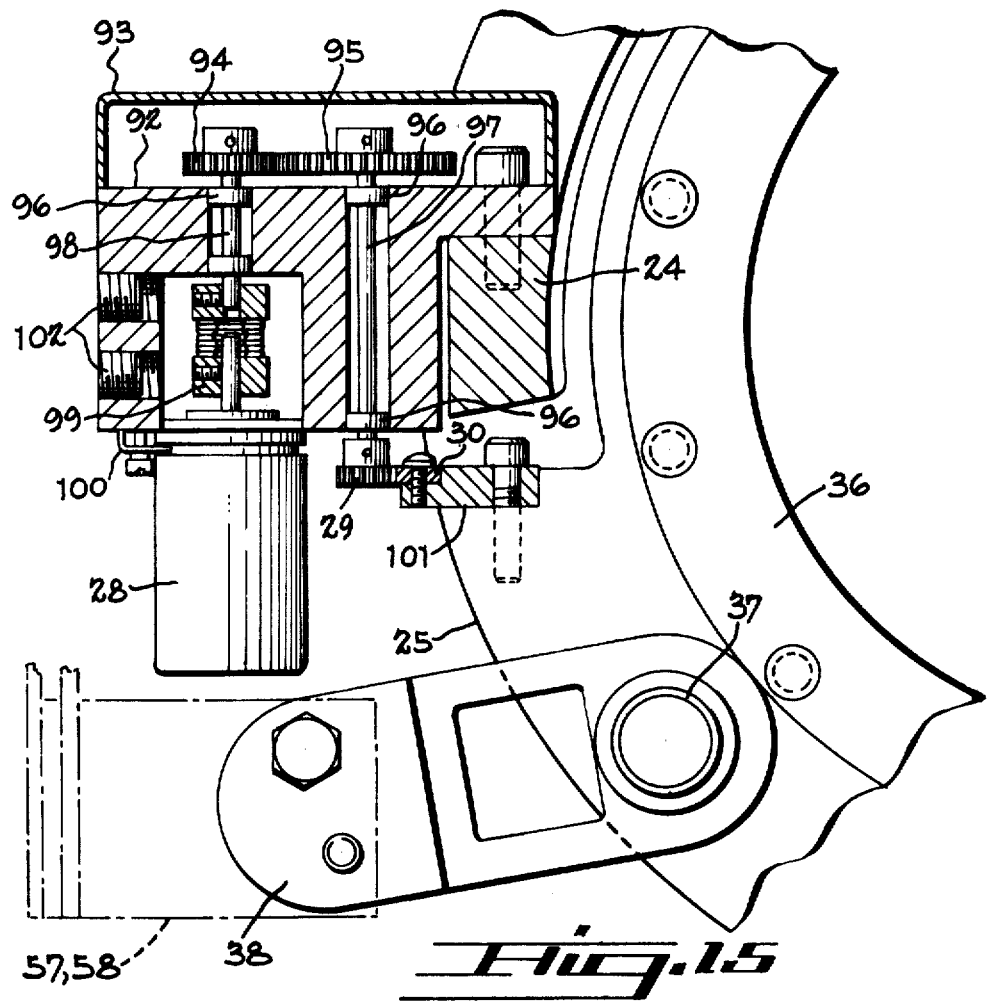
FIG. 15 is a sectional view taken along the lines 15—15 of FIG. 12.
Figure 16:
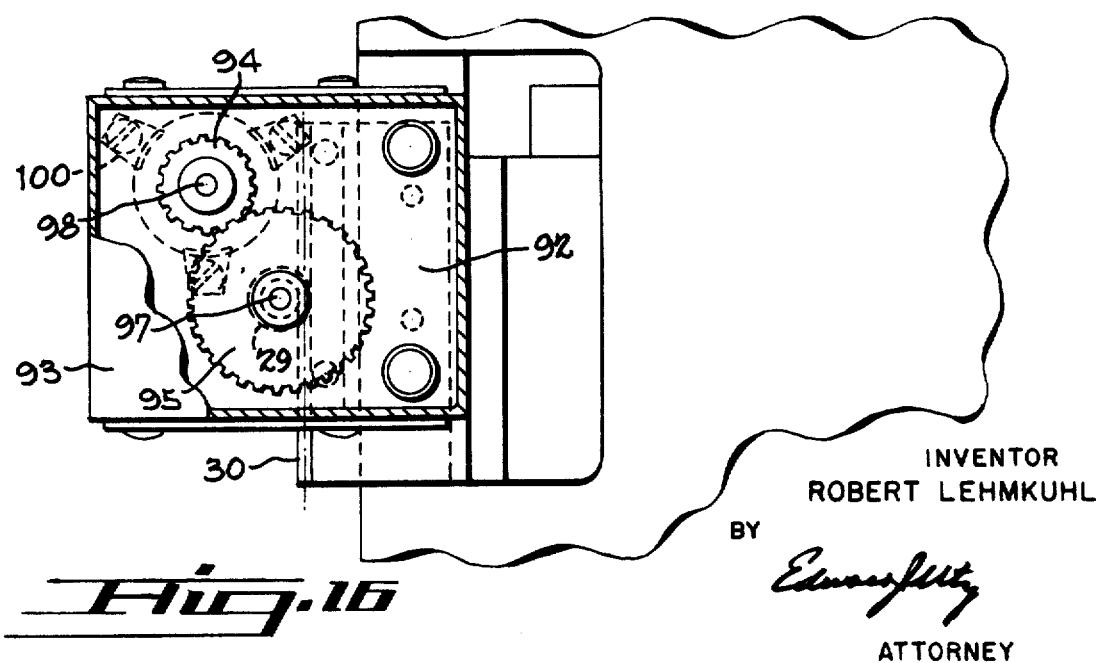
FIG. 16 is a top plan view of a portion of FIG. 15.

FIG. 14 shows the memory clamp in a tapping position. With the surface sense memory assembly in the retracted position, trip dog 38 actuates limit switch 57 as indicated in FIG. 11. Secured to surface sense memory clamp 25 is a precision rack 30, shown in FIG. 15, and adaptor 101 meshing with gear 29. Gear 29 drives rotary electrical transducer 28 through gears 94 and 95, and coupling with 99. The rotary electrical transducer 28 is in a null position when the surface sense memory clamp is in its center position as indicated in FIG. 12. The surface sense memory clamp is in the tapping position, as shown in FIG. 14. When the tap is advanced to a position where it is entering the workpiece, it takes the surface sense memory device, as illustrated in FIG. 14, off center and then causes the rotation of gear 95 to actuate the rotary electrical transducer 28. The actuation of the rotary electrical transducer signals the control center, which in turn signals the servo mechanism 31 (FIG. 2), to have the head follow the tap into the workpiece. As long as the rotary electrical transducer is out of null and the tap is proceeding into the work in the desired manner, the head is lagging behind the spindle and following at a predetermined distance. In the event a tap is broken or there is other malfunction of the tapping, the head will catch up with the spindle, cause the rotary electrical transducer to null and this signals a malfunction.

Figure 17:
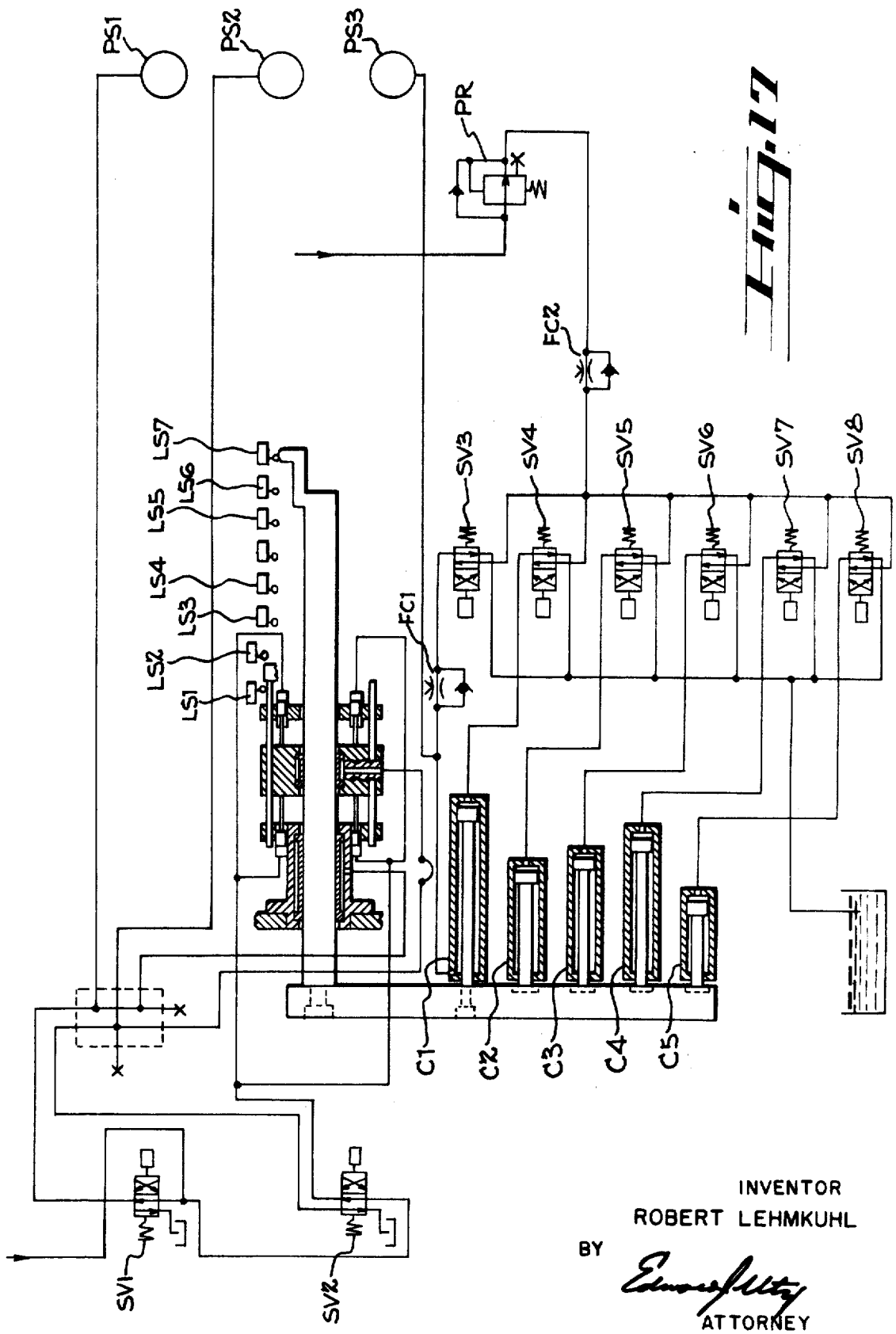
FIG. 17 is a schematic view of the hydraulic mechanism.

FIG. 17 is a hydraulic and mechanical schematic diagram of the above described spindle positioner and surface sense cylinder combination, spindle thrust clamp, surface sense memory clamp and the valves and switches which are used in the control. The cylinder C1, in FIG. 17, advances the spindle rapidly when in surface sensing mode. When the rotating drill strikes the workpart, the pressure drop in hydraulic line HL1 causes pressure switch PS3 to operate. This signal actuates the spindle clamp mechanism locking the spindle to the head and initiating head feed and depth measurement. Solenoid valves SV5 through SV8 control the discrete position cylinders.

Having thus described my invention, what I claim as new and useful and desire to secure by U.S. Letters Patent is:

1. In a machine tool having a bedplate, a horizontal saddle movable along said bedplate, a column secured to said horizontal saddle, a vertical saddle secured to said column, a head secured to said vertical saddle, a free floating spindle in said head, for carrying a tool, the combination of means for rapidly advancing the head and spindle to a predetermined position, means for advancing the spindle, until the tool in said spindle contacts the work surface, a spindle clamp for securing said spindle to said head, a surface sense memory clamp secured to said spindle, said surface sense memory clamp and spindle clamp actuated when said tool contacts said work surface, and means for feeding said head and spindle as a unit at a predetermined feed rate until the tool reaches a predetermined depth.

2. The device of claim 1 wherein the means for rapidly advancing the spindle to predetermined positions comprise a series of hydraulically operated piston rods prepositioned to establish the movement of the spindle to predetermined points.

3. The device of claim 1 wherein the means for advancing the spindle until the tool in said spindle contacts the work surface comprises a hydraulically operated piston rod, a surface sense memory clamp, said surface sense memory clamp comprising a sleeve, a clamp body, means comprising a valve and pressure switch for actuating said surface sense memory clamp, a clamp for securing said spindle to said head and means for feeding said spindle and said head to a predetermined depth.

4. In a machine tool having a bedplate, a horizontal saddle movable along said bed plate, a column secured to said horizontal saddle, a vertical saddle secured to said column, a head secured to said vertical saddle, a free floating spindle in said head for carrying a tool, the combination of means for rapidly advancing the head and spindle to a predetermined position, means for advancing the spindle until the tool in said spindle contacts the work surface, a surface sense memory clamp secured to said spindle actuated when said tool contacts said work surface, and means for feeding said head.

5. The device of claim 4 wherein an electrical rotary transducer in a tapping operation is actuated to signal a control center to actuate a servo mechanism to cause the head carrying the spindle carrying the tap to follow the tap into and out of the work piece.

6. The device of claim 4 wherein an electrical rotary transducer is actuated in a tapping operation when a tap breaks in response to the stopping of the head prior to its programmed depth to prevent further movement of the spindle and tool into the work piece.

References Cited

UNITED STATES PATENTS

| 3,273,182 | 9/1966 | McDonald | 408—10 |
| 3,302,492 | 2/1967 | Weidig | 408—11 |

GERALD A. DOST, Primary Examiner

U.S. Cl. X.R.

90—14